United States Patent
Kesek et al.

(10) Patent No.: US 12,448,998 B2
(45) Date of Patent: Oct. 21, 2025

(54) PROPELLER SHAFT ASSEMBLY FOR AIRCRAFT ENGINE

(71) Applicant: PRATT & WHITNEY CANADA CORP., Longueuil (CA)

(72) Inventors: Mateusz Kesek, Nagawczyna (PL); Tomasz Rozputynski, Hyżne (PL)

(73) Assignee: PRATT & WHITNEY CANADA CORP., Longueuil (CA)

(*) Notice: Subject to any disclaimer, the term of this patent is extended or adjusted under 35 U.S.C. 154(b) by 421 days.

(21) Appl. No.: 17/932,748

(22) Filed: Sep. 16, 2022

(65) Prior Publication Data

US 2024/0093641 A1    Mar. 21, 2024

(51) Int. Cl.
| | |
|---|---|
| F16C 3/02 | (2006.01) |
| F16D 1/076 | (2006.01) |
| B64C 11/02 | (2006.01) |

(52) U.S. Cl.
CPC ............. *F16C 3/023* (2013.01); *F16D 1/076* (2013.01); *B64C 11/02* (2013.01); *F16B 2200/506* (2018.08)

(58) Field of Classification Search
CPC ....... B64C 11/02; F01D 5/026; F01D 25/243; F02C 7/36; F16B 4/004; F16B 2200/506; F16C 3/023; F16C 3/026; F16C 2326/06; F16D 1/027; F16D 1/033; F16D 1/068; F16D 1/072; F16D 1/076; Y10T 403/645
USPC ........................................................ 403/337
See application file for complete search history.

(56) References Cited

U.S. PATENT DOCUMENTS

| | | | |
|---|---|---|---|
| 2,828,956 A | 4/1958 | Bieniosek et al. | |
| 3,322,200 A | 5/1967 | Henry | |
| 3,585,815 A | 6/1971 | Hubbard | |
| 4,406,640 A | 9/1983 | Franklin et al. | |
| 4,451,245 A * | 5/1984 | Hornig .................... | F16C 3/026 |
| | | | 464/181 |

(Continued)

FOREIGN PATENT DOCUMENTS

| | | |
|---|---|---|
| CA | 3149073 | 8/2022 |
| CN | 110605528 B | 3/2022 |

(Continued)

OTHER PUBLICATIONS

European Search Report issued on Jan. 30, 2024 for corresponding application No. 23197262.1.

*Primary Examiner* — Josh Skroupa
(74) *Attorney, Agent, or Firm* — NORTON ROSE FULBRIGHT CANADA LLP (57) ABSTRACT

A propeller shaft assembly for an aircraft engine includes a shaft having a bore extending through the shaft at a front end thereof, the front end of the shaft having an outer surface facing radially outwardly from the shaft and an inner surface spaced apart from the outer surface and facing radially inwardly to the bore. The shaft has a front flange extending radially outwardly on the outer surface, the front flange having a base merging with the outer surface of the shaft. A sleeve is coupled to the shaft within the bore by an interference fit between the sleeve and the shaft, at least part of the sleeve axially aligned with the front flange. The sleeve axially extends from a front to a rear sleeve end, the rear sleeve end axially offset from the engine side surface of the front flange at the base of the front flange.

16 Claims, 5 Drawing Sheets

(56) References Cited

U.S. PATENT DOCUMENTS

| | | | | |
|---|---|---|---|---|
| 4,706,364 A * | 11/1987 | Aubry | ............. | F16C 3/026 |
| | | | | 464/181 |
| 4,849,152 A * | 7/1989 | Rumberger | ............. | F16C 3/026 |
| | | | | 264/296 |
| 5,421,781 A * | 6/1995 | Mackellar | ............. | F16D 1/068 |
| | | | | 464/181 |
| 7,322,180 B2 | 1/2008 | Lapergue et al. | | |
| 7,874,925 B2 * | 1/2011 | Dewhirst | ............. | F16D 1/072 |
| | | | | 464/181 |
| 8,161,623 B2 | 4/2012 | Baechle et al. | | |
| 8,167,727 B2 | 5/2012 | Anema | | |
| 8,734,017 B1 | 5/2014 | Colson et al. | | |
| 9,216,495 B2 * | 12/2015 | Farineau | ............. | F16D 1/076 |
| 11,466,725 B2 * | 10/2022 | Pethick | ............. | F16C 3/026 |
| 11,994,141 B2 | 5/2024 | Merritt et al. | | |
| 12,078,211 B2 * | 9/2024 | Geislinger | ............. | F16D 1/076 |
| 2008/0012329 A1 | 1/2008 | Dewhirst | | |
| 2014/0179450 A1 | 6/2014 | Chang | | |
| 2017/0191559 A1 | 7/2017 | Russ | | |
| 2019/0072080 A1 | 3/2019 | Lemma et al. | | |
| 2021/0071646 A1 | 3/2021 | Schroer | | |
| 2022/0112846 A1 | 4/2022 | Dionne | | |
| 2024/0093720 A1 | 3/2024 | Kesek et al. | | |
| 2024/0093721 A1 | 3/2024 | Kesek et al. | | |

FOREIGN PATENT DOCUMENTS

| | | | | |
|---|---|---|---|---|
| DE | 4313296 A1 * | 6/1994 | ............. | F16B 4/004 |
| DE | 19842821 A1 * | 4/2000 | ............. | F16C 3/026 |
| EP | 1956187 | 4/2012 | | |
| EP | 2882962 B1 | 10/2016 | | |
| FR | 2643686 A1 * | 8/1990 | ............. | F16C 3/026 |
| KR | 20080036309 | 4/2008 | | |
| KR | 20180121173 | 11/2018 | | |
| WO | 2013190459 | 12/2013 | | |
| WO | WO-2013190459 A1 * | 12/2013 | ............. | F16D 1/108 |

\* cited by examiner

PROPELLER SHAFT ASSEMBLY FOR AIRCRAFT ENGINE

TECHNICAL FIELD

The disclosure relates generally to aircraft engines and, more particularly, to propeller shaft assemblies for such engines.

BACKGROUND

Propeller shafts are subjected to significant bending moments resulting from airplane maneuvers—due to aerodynamic and gyroscopic loads, for instance—, and/or propeller shape or size, amongst other possibilities. During operation of the engine, the front portion of the propeller shaft is an area subjected to high stress amplitudes and concentration caused by cyclic external loads during operation of the engine. The front portion of the propeller shaft at a propeller shaft/hub interface may be exposed to high stress from engine operation and/or service damage during the mounting and the unmounting of the propeller hub to the shaft and/or as the front portion of the shaft is exposed to the environment for engine maintenance. Limiting and/or controlling stress concentration in such area therefore remains a concern for increasing engine safety and extending service life.

SUMMARY

There is accordingly provided a propeller shaft assembly for an aircraft engine, comprising: a shaft having a bore extending through the shaft at a front end thereof, the front end of the shaft having an outer surface facing radially outwardly from the shaft and an inner surface spaced apart from the outer surface and facing radially inwardly to the bore, the shaft having a front flange extending radially outwardly on the outer surface, the front flange defining a hub side surface and an engine side surface opposite the hub side surface and axially spaced apart therefrom, the hub side surface of the front flange adapted to abut with a propeller hub, the front flange having a base merging with the outer surface of the shaft; and a sleeve coupled to the shaft within the bore by an interference fit between the sleeve and the shaft, at least part of the sleeve axially aligned with the front flange, the sleeve axially extending from a front sleeve end to a rear sleeve end, the rear sleeve end axially offset from the engine side surface of the front flange at the base of the front flange.

The propeller shaft assembly defined above and described herein may further include one or more of the following features, in whole or in part, and in any combination.

In certain aspects, the interference fit has a tolerance within the following range: from 0.0004 inch and 0.003 inch per inch of diameter of the bore where the sleeve interfaces with the inner surface.

In certain aspects, the shaft has an annular shaft wall defining the inner surface, the annular shaft wall having a cylindrical portion extending from the base of the front flange, the cylindrical portion having a constant thickness (H) measured from the inner surface to the outer surface of the shaft, the sleeve has an annular sleeve wall having a thickness (h), a ratio H/h is between 0.4 and 2.5.

In certain aspects, the thickness (h) of the sleeve is constant from the front sleeve end to the rear sleeve end.

In certain aspects, the sleeve has a first section having a thickness greater than that of a second section adjacent the first section, the wall thickness (h) of the sleeve being taken in the second section.

In certain aspects, the sleeve has a stepped annular wall having a first section of greater thickness than a second section adjacent the first section, wherein a step of the annular step wall axially aligned with the front flange.

In certain aspects, the base defines a fillet between the front flange and the outer surface of the shaft.

In certain aspects, the fillet has a radius varying along a chord length of the fillet.

In certain aspects, the base of the front flange is defined by a shaft wall section having a progressively reducing wall thickness from the engine side surface of the front flange, the sleeve extends axially beyond the base of the front flange.

In certain aspects, the hub side surface and the engine side surface of the front flange are flat surfaces.

In certain aspects, the shaft has an undercut defined in the inner surface of the shaft, the undercut extending peripherally along the rear sleeve end, the undercut defining a zone of increased bore size axially spaced from the engine hub surface of the front flange.

In certain aspects, the base of the front flange is defined by a shaft wall section having a progressively reducing wall thickness from the engine side surface of the front flange, the wall section and the undercut overlapping axially.

In certain aspects, the propeller hub is removably connected to the front flange, the propeller hub having a flange engaging surface axially engaging the hub side surface of the front flange.

There is also provided a propeller shaft assembly for an aircraft engine, comprising: a shaft having a bore extending through the shaft at a front end thereof, the front end of the shaft having an outer surface facing radially outwardly from the shaft and an inner surface spaced apart from the outer surface and facing radially inwardly to the bore, the shaft having a front flange extending radially outwardly on the outer surface, the front flange defining a hub side surface adapted to face a propeller hub and an engine side surface opposite the hub side surface; and a sleeve coupled to the shaft within the bore, the sleeve radially loaded against the inner surface of the shaft, the sleeve extending axially from a front sleeve end to a rear sleeve end, the rear sleeve end axially offset relative to the engine side surface.

The propeller shaft assembly defined above and described herein may further include one or more of the following features, in whole or in part, and in any combination.

In certain aspects, the sleeve is coupled to the shaft by an interference fit between the sleeve and the shaft, the interference fit has a tolerance within the following range: from 0.0004 inch and 0.003 inch per inch of diameter of the bore where the sleeve interfaces with the inner surface.

In certain aspects, the shaft has an annular shaft wall defining the inner surface, the annular shaft wall having a cylindrical portion extending from a base of the front flange, the base of the front flange defining a fillet, the cylindrical portion extending from an end of the fillet and having a constant thickness (H) measured from the inner surface to the outer surface of the shaft, the sleeve has an annular sleeve wall having a thickness (h), a ratio H/h is between 0.4 and 2.5.

BRIEF DESCRIPTION OF THE DRAWINGS

Reference is now made to the accompanying figures in which.

DETAILED DESCRIPTION

Figure 1:
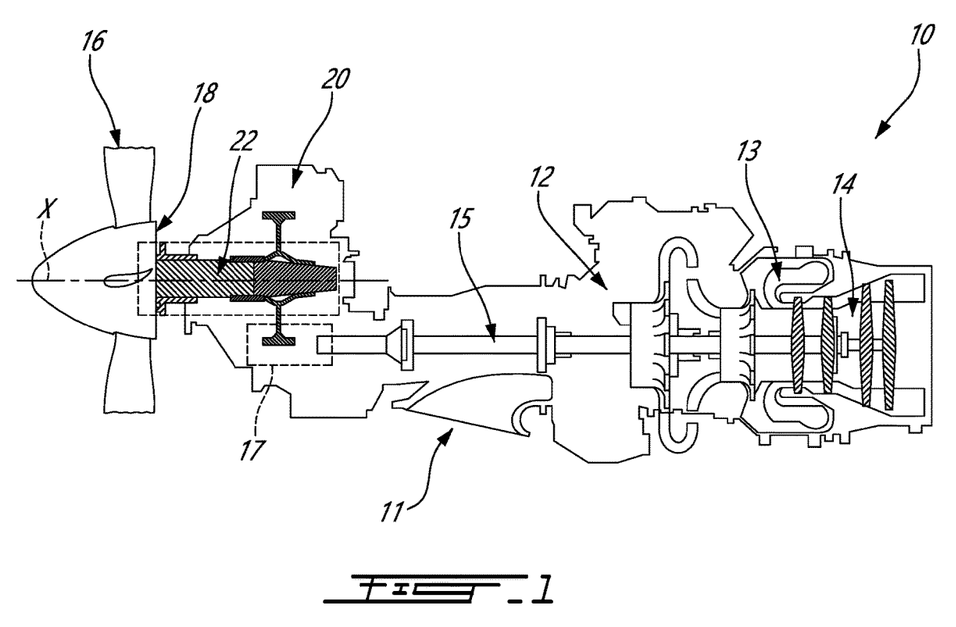
FIG. 1 is a schematic cross sectional view of an aircraft engine having a propeller shaft assembly.

FIG. 1 illustrates an aircraft engine 10 of a type preferably provided for use in subsonic flight, generally comprising in serial flow communication an air intake 11 through which air is drawn, a compressor section 12 within which the air is compressed, a combustor 13 in which the compressed air is mixed with fuel and ignited for generating an annular stream of hot combustion gases, and a turbine section 14 for extracting energy from the combustion gases.

The aircraft engine 10 of FIG. 1 is a turboprop engine, and therefore includes a power output shaft 15 connected to and driven by one or more of the turbines from the turbine section 14 to transmit a driving force to a propeller 16 of the aircraft via a propeller shaft assembly 20, with or without a reduction gearbox 17 between the output shaft 15 and the propeller shaft assembly 20. In some embodiments, the output shaft 15 could be in direct driving engagement with the propeller 16, for example.

The propeller shaft assembly 20 has at least one propeller shaft 22 (or simply, shaft 22). The shaft 22 defines a propeller hub interface adapted to be coupled with a propeller hub 18 of the propeller 16, as further described later. The shaft 22 has a shaft axis X, which may be coextensive with a rotation axis of the propeller 16 in at least some embodiments. Stated otherwise, in at least some embodiments, the propeller 16 may be mounted for rotation about the shaft axis X to the shaft 22. The rotational axis of the propeller 16 and the shaft axis X could be non-coextensive in other embodiments.

Figure 2A:
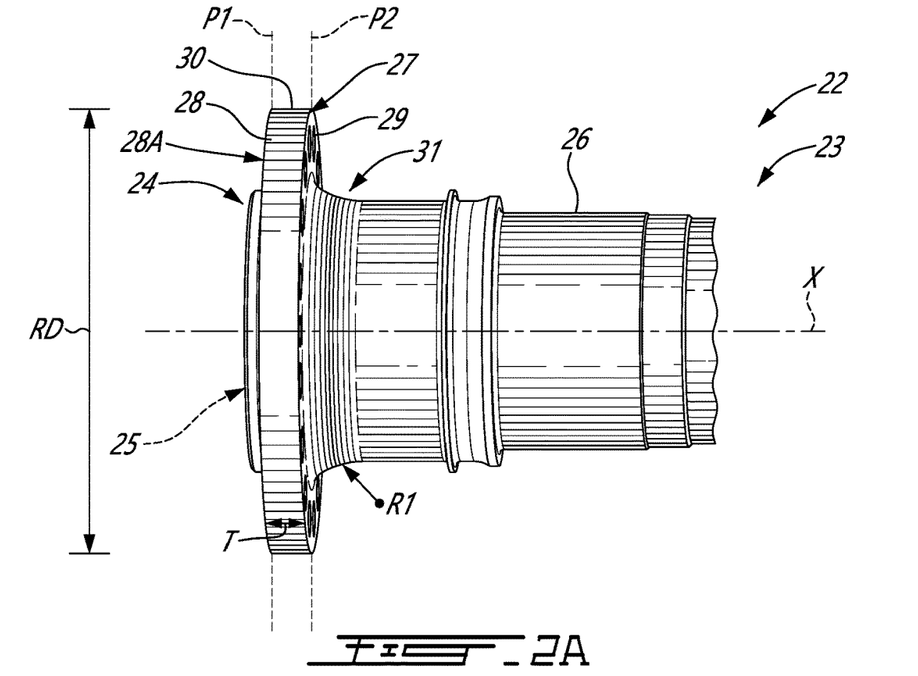
FIG. 2A is a longitudinal view of a portion of a shaft of the propeller shaft assembly of the aircraft engine of FIG. 1.
Figure 2B:
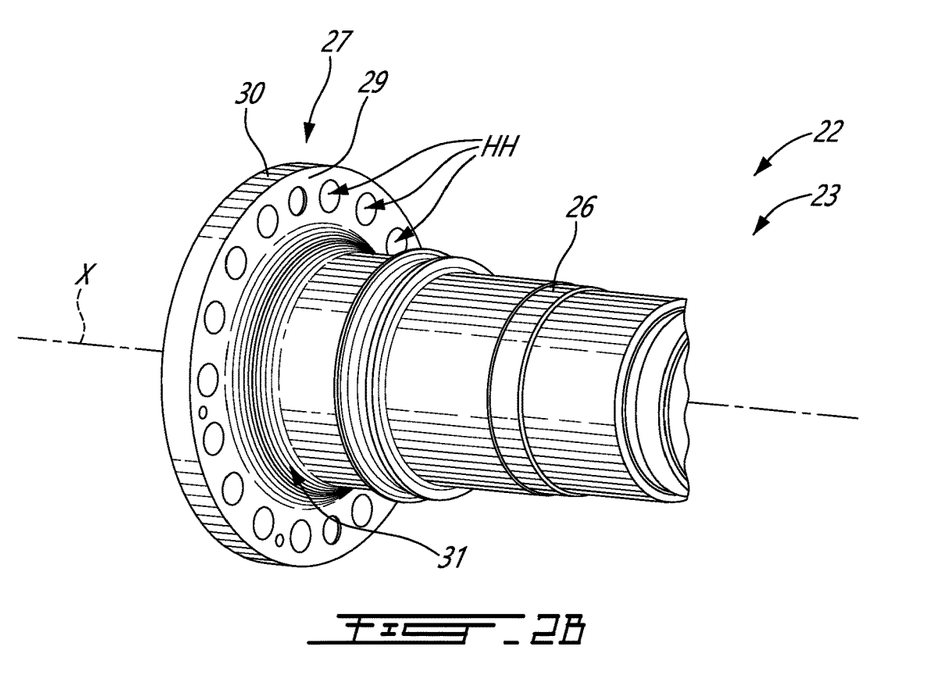
FIG. 2B is perspective view of the portion of the shaft of FIG. 2A.

Other aspects of the propeller shaft assembly 20 are now described with reference to FIGS. 2A-2B, which show a front end portion 23 of the shaft 22. As shown, the shaft 22 has a front end 24. The front end 24 is the forwardmost point of the shaft 22, which engages with the propeller 16. The shaft 22 is hollowed at least in the front end portion 23. The shaft 22 has a bore 25, which can be seen in the following figures. The bore 25 extends through the shaft 22 at the front end 24. The bore 25 may serve as a fluid channel for fluid flow communication with the propeller hub 18. Pressurized oil, or other fluid, may be supplied to propeller control systems/units and/or blade actuators, via the bore 25.

The shaft 22 has an outer surface 26 facing radially outwardly from the shaft 22. The outer surface 26 may be supported by bearings (not shown) or other components for rotation of the shaft 22 about the shaft axis X. Seals, rings or other engine components may also interface with the shaft 22 along the outer surface 26.

The shaft 22 has a front flange 27 which extends radially outwardly from the outer surface 26. The front flange 27 is adapted to engage and/or mate with the propeller hub 18, which will be further described later. The front flange 27 has a disc shape and extends circumferentially about the shaft axis X. Other shapes may be contemplated, whether or not extending circumferentially about a full circumference of the shaft 22. For example, the front flange 27 could define separate flange segments extending outwardly from the outer surface 26. The front flange 27 could have a non circular shape, such as an oval shape, square shape, polygonal shape, or have an irregular outline, as some other examples. The front flange 27 defines a hub side surface 28 and an engine side surface 29 axially spaced apart from the hub side surface. 28 The hub side surface 28 and the engine side surface 29 face away from each other, here in opposite directions. The hub side surface 28 defines a hub interface 28A. As further described later, the hub interface 28A may abut against the propeller hub 18 when the front flange 27 is coupled therewith.

In at least some embodiments, the hub side surface 28 and the engine side surface 29 are flat surfaces. As shown, the hub side surface 28 extends in a plane P1 and the engine side surface 29 extends in a plane P2. In the embodiment shown, the planes P1 and P2 are parallel one to another, so are the surfaces 28, 29. The planes P1 and P2 could have a different relative orientation in other embodiments. For example, the planes P1 and P2, and/or the hub side surface 28 and the engine side surface 29 could extend angularly relative to each other. As another example, the hub side surface 28 and/or the engine side surface 29 could have an irregular, convex, concave, or other outlines. The hub side surface 28 and/or the engine side surface 29 could also define ribs, grooves, or keying features, for example.

The front flange 27 has an outer periphery 30 extending between the hub side surface 28 and the engine side surface 29. The outer periphery 30 defines a radialmost surface of the front flange 27 which extends annularly about the front flange 27. The outer periphery 30 joins the hub side surface 28 to the engine side surface 29.

The front flange 27 has a thickness T and a radial outer dimension RD. The thickness T is a maximum thickness which may be measured from the hub side surface 28 to the engine side surface 29 (or vice versa). The thickness T may be uneven, depending on the outline of the surfaces 28, 29 as discussed above, for example. The radial outer dimension RD may correspond to an outer diameter in the embodiments where the front flange 27 has a disc shape, such as shown, or oval shape. The radial outer dimension RD may be measured at the outer periphery 30. The radial outer dimension RD may be a maximum outer dimension of the front flange 27, e.g., where the flange outline and/or outer periphery 30 is irregular or non-circular.

The front flange 27 has a plurality of holes HH extending therethrough. The holes HH extend from the hub side surface 28 to the engine side surface 29. In the embodiment shown, the holes HH are circumferentially spaced apart from each other in the front flange 27. These holes HH may receive fasteners for removably coupling the front flange 27 to the propeller hub 18. The front flange 27 and the propeller hub 18 could be coupled in other suitable manner, such as via male-female connections, interlocking features, threads, lock rings, keying features, for example.

The front flange 27 has a base 31 which merges with the outer surface 26 of the shaft 22. The base 31 may be referred to as a transition area between the front flange 27 and the outer surface 26. The base 31, or transition area, may extend axially between the engine side surface 29 of the front flange 27 and the outer surface 26 of the shaft 22. The base 31, or transition area, may be defined as shaft wall section having a progressively reducing wall thickness from the outer periphery 30 and/or radialmost surface of the front flange 27 to the outer surface 26 of the shaft 22. In an embodiment, the base 31 defines a fillet having a radius R1. Stated otherwise, a fillet is defined between the front flange 27 and the outer surface 26 of the shaft 22. In an embodiment, the radius R1 is constant over the entire axial dimension of the fillet. The radius R1 could vary along a cord length of the fillet. The base 31 could define a chamfer, in other embodiments. A progressively reducing radial thickness of the shaft wall at the base 31 of the front flange 27 may limit stress amplitude and concentration in such transition area between the front flange 27 and the outer surface 26. It may also facilitate the manufacturing, depending on the manufacturing technique used (e.g., machining, casting, molding), in contrast with a right-angled corner, for example. Even with such progressively reducing radial thickness of the shaft wall at the base 31 of the front flange 27, high stress amplitudes may still exist in such transition area during operation because of the loads e.g., bending moments, imparted by the rotating propeller 16. In operation, airplane maneuvers, aerodynamic and gyroscopic loads transmitted to the front flange 27 via the rotating propeller 16 may cause cyclic stresses and/or loadings in such transition area, which receives a substantial proportion, if not all, of the loads produced by the rotating propeller 16. Stress concentration in such area, with high stress amplitudes, may affect the service life of the shaft 22, hence the engine 10 over time. For engine certification purposes, including compliance with damage tolerance regulations, for example, improvements over previous designs of propeller shaft assemblies may be sought in response to the evolving requirements specification and increasing performance needs of the engine 10. However, various cumulative design constraints may be involved, such as proximity with other parts in the engine 10, various interfaces with such parts, limited space, tight tolerances for part assemblies, and weight control.

Referring to FIGS. 3A to 3D, various embodiments of the propeller shaft assembly 20 of the present disclosure which address the above concerns will be presented. As further described later with reference to FIGS. 3A to 3D, the propeller shaft assembly 20 includes a sleeve 40 coupled to the shaft 22 within the bore 25.

Figure 3A:
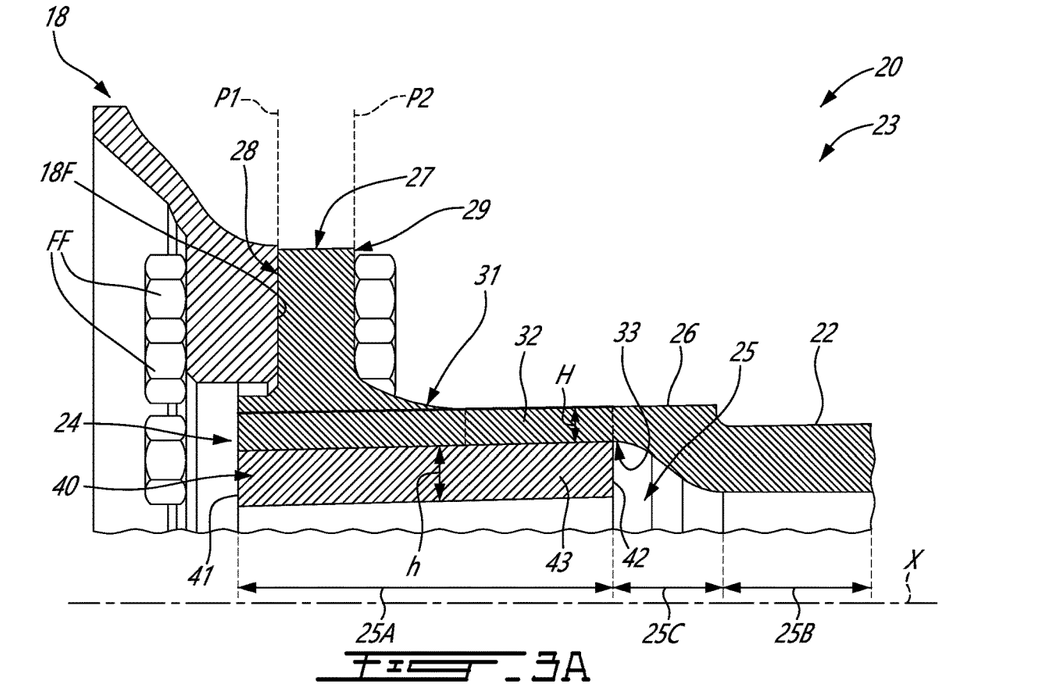
FIG. 3A is a partial cross-sectional view of the portion of the shaft of FIGS. 2A-2B and a propeller hub mounted to the shaft, according to an embodiment.

FIG. 3A illustrates a front end portion 23 of the shaft 22 of the propeller shaft assembly 20. The propeller hub 18 is removably coupled to the front flange 27 of the shaft 22 via a plurality of fasteners FF. The propeller hub 18 has a flange engaging surface 18F axially engaging the front flange 27. The hub interface 28A of the front flange 27 abuts against the propeller hub 18. The propeller hub 18 and the front flange 27 have complementary surfaces for mating engagement. In the embodiment shown, the complementary surfaces of the propeller hub 18 and the front flange 27 are flat surfaces. Other surface outlines may be contemplated for the hub side surface 28 as described above, so is for the flange engaging surface 18F of the propeller hub 18 interfacing therewith by mating engagement.

In FIG. 3A, half of the shaft 22 is shown in a cross-section. It should be understood that the other half of the shaft 22 may be mirrored on opposite side of the shaft axis X. As shown, the front end portion 23 of the shaft 22 is hollowed from the front end 24. The shaft 22 has a shaft annular wall 32. The shaft annular wall 32 has an inner surface 33 facing inwardly to the bore 25. The inner surface 33 is spaced apart, radially, from the outer surface 26. The inner surface 33 extends from the front end 24 of the shaft 22. The inner surface 33 may extend all the way through the shaft 22, however this is optional.

In at least some embodiments, such as shown, the shaft annular wall 32 has a section of constant (±5%) thickness on an engine side (opposite the hub side) of the front flange 27. Such section may be referred to as a barrel section of the shaft 22. The barrel section is a section of the shaft 22 that extends immediately adjacent from the base 31 (or end of the fillet). Such location is identified with a dotted line for visual reference. The barrel section may also be referred to as a cylindrical portion of the shaft 22. The axial extent of such barrel section/cylindrical portion of the shaft 22 may be measured from a point where the thickness of the shaft 22 becomes constant, immediately adjacent the end of the base 31 (or fillet) of the front flange 27. Such barrel section/cylindrical portion of the shaft 22 may be absent in other embodiments, where, for instance, that section of the shaft 22 extending from the end of the base 31 (or fillet) may have a transient thickness, with a frustoconical or other non-cylindrical geometry.

The propeller shaft assembly 20 includes a sleeve 40 within the bore 25. The sleeve 40 is coupled to the shaft 22. In embodiments where the barrel section (described above) is present, as shown, the sleeve 40 may extend axially along the barrel section. The sleeve 40 interfaces with the inner surface 33 of the shaft 22 within the bore 25.

In at least some embodiments, the sleeve 40 is annular. In an embodiment, the sleeve is cylindrical; however other shapes could be contemplated. For example, the sleeve 40 may have an inner sleeve wall having a different outline than cylindrical (hexagonal, pentagonal, uneven outline, crenelated, as some non-limiting examples). In at least some embodiments, the sleeve 40 has a constant wall thickness in a circumferential direction. The sleeve wall thickness could vary circumferentially and/or axially in some variants. The sleeve 40 is circumferentially continuous, so as to form a continuous ring/cylindrical shape. The sleeve could be discontinuous along its circumference in some variants (e.g., slotted).

The sleeve 40 is coupled to the shaft 22 by an interference fit between the sleeve 40 and the shaft 22. The interference fit is between the inner surface 33 of the bore 25 and the sleeve 40. In at least some embodiments, the interference fit has a tolerance from 0.0004 inch and 0.003 inch per inch of bore diameter of the bore 25 along where the sleeve 40 interfaces with the inner surface 33. However, other interference fit tolerance between the sleeve 40 and the shaft 22 may be contemplated, such as ±0.0003 about the above tolerance range. If the bore 25 has a varying diameter in such area, the minimum bore diameter is the minimum diameter in such area. The sleeve coupled to the shaft 22 by interference fit may change a stress distribution within the base 31 (fillet) of the front flange 27. The interference fit may produce a pre-stress, or "nominal" stress, within the annular wall 32 of the shaft 22. Stated otherwise, the interference fit may induce a radial stress in the annular wall 32 at least at the interface with the sleeve 40, as the annular wall 32 opposes to the radial expansion of the sleeve 40 constrained against the inner surface 33 of the annular wall 32. The sleeve 40 inducing such pre-stress may oppose to the stresses induced by the bending moments under operating conditions of the aircraft.

The sleeve 40 could be radially loaded within the bore 25 in other ways. Stated otherwise, a nominal stress within the annular 32 of the shaft 22 induced by the sleeve 40 in a deformed and/or radially loaded state could be obtained differently. For example, in a variant, it could also be contemplated to have a sleeve 40 elastically deformable circumferentially so as to reduce its outer periphery for insertion into the bore 25, and, when released, expanded so as to induce a radially outward load on the inner surface 33 of the bore 25. A spring-loaded sleeve 40 could therefore be contemplated so as to produce a pre-stress in the annular wall 32 of the shaft 22 to oppose to the stresses induced by the bending momentum at the base 31 of the front flange 27 under operating conditions of the aircraft.

The sleeve 40 includes a sleeve front end 41 (or hub side end) and a sleeve rear end 42 (engine side end). The sleeve 40 extends axially from the sleeve front end 41 to the sleeve rear end 42. At least part of the sleeve 40 being axially aligned with the front flange 27 and/or the base 31 of the front flange 27. As shown, the sleeve rear end 42 is axially spaced (or offset) from the engine side surface 29 of the front flange 27, in a direction opposite to the front end 24 of the shaft 22. In the embodiment shown, the hub interface 28A of the front flange 27 is axially disposed between the sleeve front end 41 and the sleeve rear end 42. As shown, with respect to the plane P1 and the plane P2 (described above), the sleeve 40 may intersect axially with the planes P1 and P2. However, such relative position of the hub interface 28A of the front flange 27 and the sleeve front end 41 is optional. For instance, the front sleeve end 41 may be located between planes P1 and P2 and/or between the hub side surface 28 and the engine side surface 29 of the front flange 27 in at least some embodiments.

In at least some embodiments, as shown, the sleeve 40 extends beyond the transition area between the front flange 27 and the outer surface 26 of the shaft 22. In the embodiment shown, the sleeve 40 extends axially beyond the fillet at the base 31 of the front flange 27. The position of the base 31, either as a fillet, a chamfer, or else, relative to the sleeve 40 may be such that the cord length of the base 31 is located with a central portion of the sleeve 40 (central±10% of the length of the sleeve 40). Other relative position between the sleeve 40 and the front flange 27 or base 31 of the front flange 27 may be contemplated, as further described later.

The sleeve 40 may take up at least a portion of the bending momentum and stress imparted by the propeller loads during operation. In order to adjust a proportion of the stress taken up by the sleeve 40 instead of the shaft 22, i.e., the flange 27 and base 31 thereof, the bore 25 of the shaft 22 may be increased in size. Increasing the bore size, at least in the front end portion 23 of the shaft 22 where the sleeve 40 is located may incidentally reduce a wall thickness (H) of the shaft 22. By reducing the wall thickness (H) in a shaft wall section overlapping with the sleeve 40, stress amplitude in such shaft wall section may be reduced, and bending momentum and stress may thus be taken by the sleeve 40. Similarly, the sleeve 40 has an annular wall 43 with a thickness (h) which may be selected based on a desired stiffness of the sleeve 40 and/or relative stiffness with respect to the stiffness of the shaft 22 in the front end portion 23 thereof, or more specifically relative to the stiffness of the shaft 22 in the transition area (base 31) between the front flange 27 and the outer surface 26 of the shaft 22 adjacent the front flange 27.

With continued reference to FIG. 3A, the bore 25 has a first bore section 25A along the sleeve 40 and a second bore section 25B extending from the first bore section 25A. The second bore section 25B is axially spaced from the sleeve rear end 42. A progressively increasing thickness area 25C (progressively increasing towards the second bore section 25B) is defined between the first bore section 25A and the second bore section 25B. The first bore section 25A may extend from the front end 24 of the shaft 22, as shown. The first bore section 25A has a greater bore size than that of the second bore section 25B. In the embodiment shown, the sleeve 40 extends only in the first bore section 25A without extending in the second bore section 25B. The first bore section 25A, in FIG. 3A includes the barrel section of the shaft 22 (discussed above). This may be different in other embodiments.

Figure 3B:
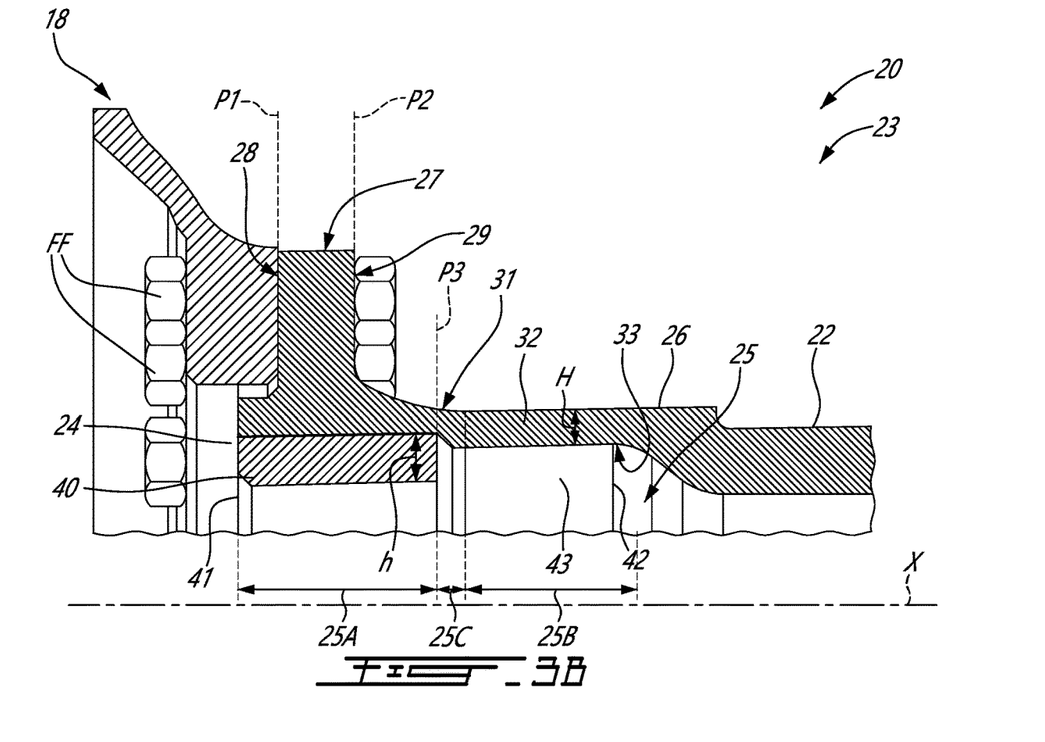
FIG. 3B is a partial cross-sectional view of the portion of the shaft of FIGS. 2A-2B and a propeller hub mounted to the shaft, according to another embodiment.

FIG. 3B illustrates another embodiment of the propeller shaft assembly 20. Like features as those already described above with respect to the other embodiments have the same reference numbers for simplicity and will not be repeatedly described herein for conciseness. As in FIG. 3A, half of the shaft 22 is shown in a cross-section. It should be understood that the other half of the shaft 22 may be mirrored on opposite side of the shaft axis X. In FIG. 3B, the sleeve 40 is coupled to the shaft 22 with an interference fit, as described above. The front end portion 23 of the shaft 22 is shown similarly as in FIG. 3A. In the embodiment shown, the sleeve 40 has its sleeve rear end 42 axially aligned with the base 31 of the front flange 27. Stated otherwise, the sleeve 40 does not extend axially beyond the base 31 (or fillet) on the engine side of the front flange 27. The sleeve rear end 42 is axially aligned with the fillet in the transition area between the front flange 27 and the remainder of the shaft 22. The thickness (H) of the shaft 22 is at its smallest, radially, in a plane P3 aligned with the sleeve rear end 42. The first bore section 25A is shorter that in FIG. 3A. The first bore section 25A ends at an axial location within the transition area, i.e., axially between the engine side surface 29 and the outer surface 26 where the cord length of the fillet ends. As shown, the sleeve front end 41 extends axially beyond the hub side surface 28; however this is optional.

Figure 3C:
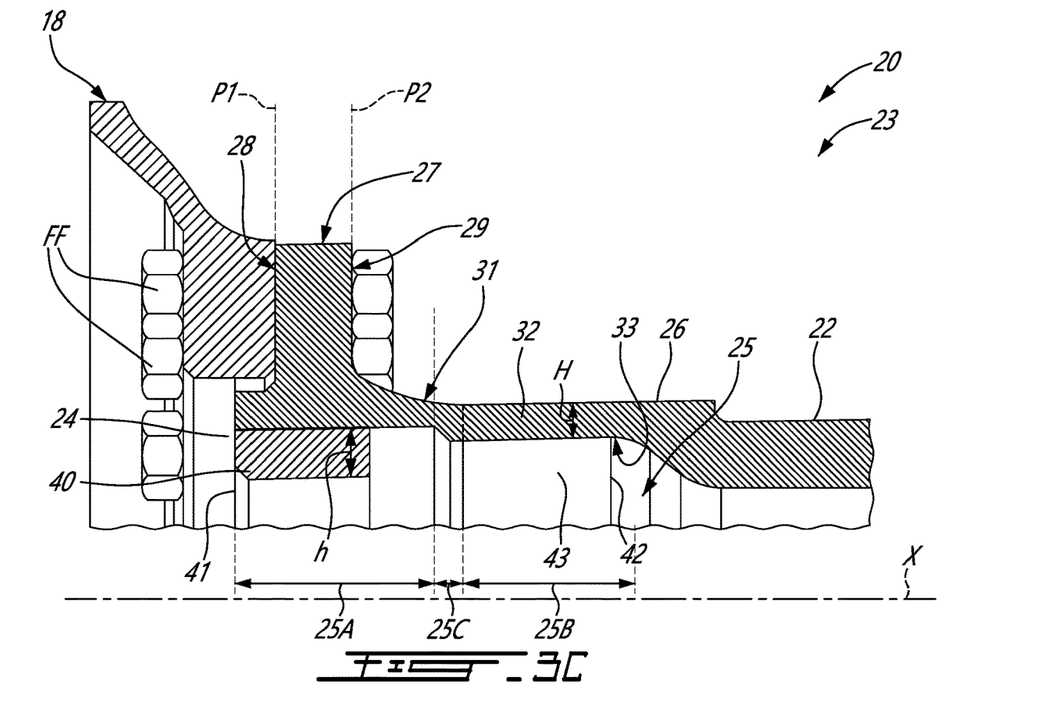
FIG. 3C is a partial cross-sectional view of the portion of the shaft of FIGS. 2A-2B and a propeller hub mounted to the shaft, according to yet another embodiment.

FIG. 3C illustrates another embodiment of the propeller shaft assembly 20. Like features as those already described above with respect to the other embodiments have the same reference numbers for simplicity and will not be repeatedly described herein for conciseness. As in FIG. 3A, half of the shaft 22 is shown in a cross-section. It should be understood that the other half of the shaft 22 may be mirrored on opposite side of the shaft axis X. In FIG. 3C, the sleeve 40, coupled to the shaft 22 by an interference fit as described above, extends beyond the engine side surface 29, but to a lesser extent that in FIG. 3B. In the embodiment shown, the sleeve rear end 42 is at an axial location in a first one third of the cord length of the fillet (or transition area) between the front flange 27 and the remainder of the outer surface 26 of the shaft 22. The sleeve 40 does not extend over an entirety of the first bore section 25A. As shown, the sleeve 40 extends over a majority of the first bore section 25A, but less than 80% of the axial extent of the first bore section 25A. There is a distance between the sleeve rear end 42 and the second bore section 25B, with such distance corresponding to approximately 35% of the axial extent of the first bore section 25A (axial extent measured from the progressively increasing thickness area 25C between the first bore section 25A and the second bore section 25B, to the front end 24 of the shaft 22).

Figure 3D:
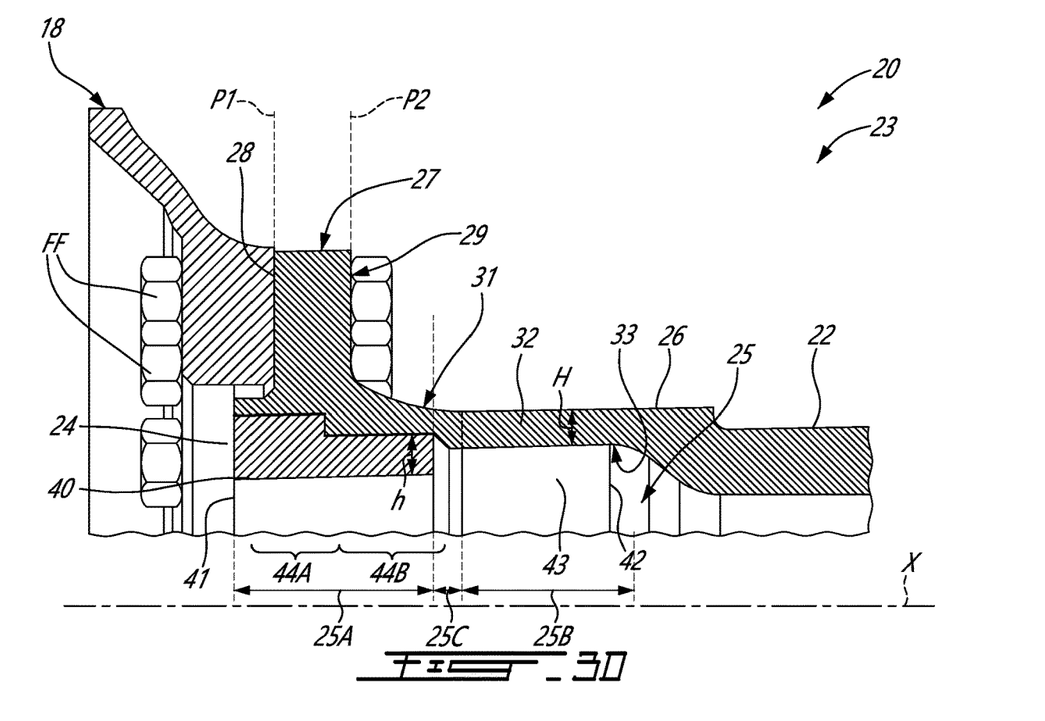
FIG. 3D is a partial cross-sectional view of the portion of the shaft of FIGS. 2A-2B and a propeller hub mounted to the shaft, according to a further embodiment.

FIG. 3D illustrates another embodiment of the propeller shaft assembly 20. Like features as those already described above with respect to the other embodiments have the same reference numbers for simplicity and will not be repeatedly described herein for conciseness. As in FIG. 3A, half of the shaft 22 is shown in a cross-section. It should be understood that the other half of the shaft 22 may be mirrored on opposite side of the shaft axis X. In the embodiment discussed with respect to FIGS. 3A to 3C, the sleeve 40 has a constant thickness (h) from the sleeve front end 41 to the sleeve rear end 42. In the embodiment shown in FIG. 3D, the sleeve 40, also coupled to the shaft 22 via an interference fit, has a varying thickness (h). As shown, the sleeve 40 has a first section 44A having a thickness greater than that of a second section 44B adjacent the first section 44A. In an embodiment, the sleeve 40 has a stepped annular wall 43 having a first section 44A of greater thickness than a second section 44B adjacent the first section 44A. In FIG. 3D, a step of the stepped annular wall is axially aligned with the front flange 27 and/or between the plane P1 and P2, and/or axially between the hub side surface 28 and the engine side surface 29 of the front flange 27. Other possibilities may be contemplated, such as having the step 45 axially aligned with the engine side surface 29, or axially aligned with the base 31 (e.g., fillet) of the front flange 27, for example. The first section 44A extends along a first subsection of the first bore section 25A and the second section 44B of the sleeve 40 extends along a second subsection of the first bore section 25A. The first subsection extends from the front end 24 of the shaft 22, and the second subsection extends axially front the first subsection, toward the second bore section 25B of the bore 25. The first bore section 25A therefore also has a stepped annular wall or step defined in the inner surface 33 of the shaft 22.

In at least some embodiments, including the various embodiments described with reference to FIGS. 3A to 3D, a ratio of the thickness (H) of the annular shaft wall 32 and the thickness (h) of the annular sleeve wall 43 is between 0.4 and 2.5. Such thickness (H) of the annular shaft wall 32 may be measured where the base 31 (or fillet) ends (e.g., ±0.010 inch from where the thickness of the annular wall 32 becomes constant). In the embodiments shown in FIGS. 3A to 3D, the measurement location of the thickness (H) may be defined as the location where the cord length of the fillet (or transition area) ends (or immediately adjacent thereto), with the measurement taken between the inner surface 33 and the outer surface 26 of the shaft 22. In at least some embodiment, such location corresponds to a location within the barrel section (if present), or at the location where such barrel section starts and the fillet ends. In FIG. 3A, such location correspond to a location within the first bore section 25A. In the embodiments shown in FIGS. 3B to 3D, the thickness (H) of the annular shaft wall 32 is measured in the second bore section 25B (the bore section adjacent the bore section 25A in which the sleeve 40 extends). The thickness (h) of the sleeve annular wall 43 may be a minimum thickness of the sleeve annular wall 43, for instance where the sleeve annular 32 has a non-constant thickness, as opposed to a constant thickness (h) has in FIGS. 3A to 3C, for example. In FIG. 3D, for example, the thickness (h) of the sleeve annular wall 43 is a minimum thickness, which is measure in the second section 44B of the sleeve 40.

Figure 4:
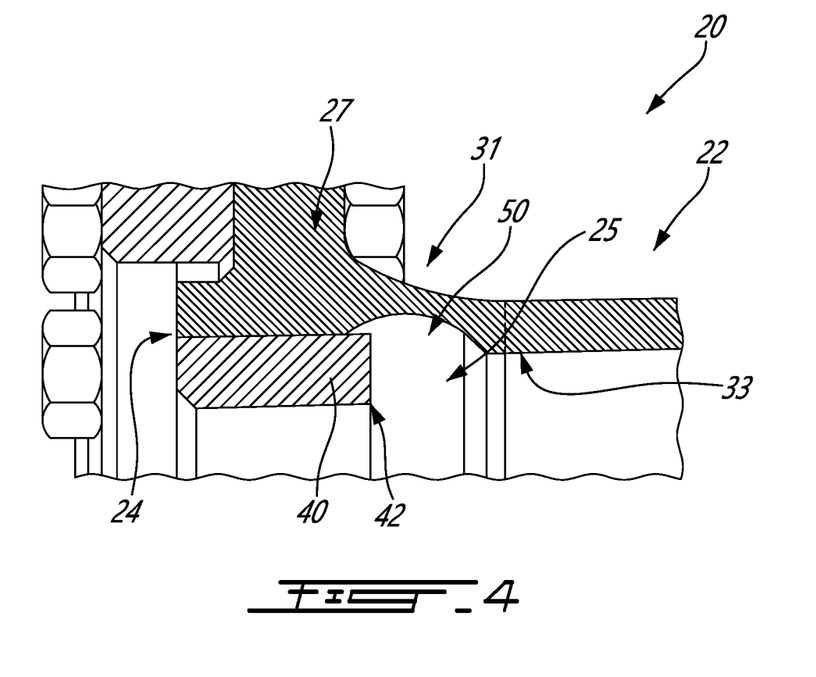
FIG. 4 is a magnified view of a partial cross-sectional view of the portion of the shaft of FIGS. 2A-2B, according to an alternate embodiment.

Referring to FIG. 4, in a variant of the propeller shaft assembly 20 discussed hereinabove, the shaft 22 may have an undercut 50 defined in the inner surface 33 of the bore 25. As shown, the undercut 50 may extend peripherally along the rear sleeve end 42. The undercut 50 defines a zone of increased bore size axially spaced from the engine hub surface 29 of the front flange 27. In the variant shown, the undercut 50 extends axially along the transition area (discussed above). Stated otherwise, the section of the annular shaft wall 32 of the shaft 22 which has a progressively reducing wall thickness from the engine side surface 29 of the front flange 27, and the undercut 50 overlap axially. The thickness of the annular shaft wall 32 where the undercut 50 and the transition area—here the fillet—overlap may be the section of the shaft 22 which has the thinness wall section between the front end 24 and an axial location coinciding with the end of the cord length of the transition area (here, fillet), in at least some cases.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while an airborne turboprop engine 10 is shown in FIG. 1, it is to be understood that the present disclosure could apply to other types of aircraft engines, including for example turboshaft engines. Yet further modifications could be implemented by a person of ordinary skill in the art in view of the present disclosure, which modifications would be within the scope of the present technology.

The invention claimed is:

1. A propeller shaft assembly for an aircraft engine, comprising:

a shaft having a bore extending through the shaft at a front end thereof, the front end of the shaft having an annular shaft wall defining an outer surface facing radially outwardly from the shaft and an inner surface spaced apart from the outer surface and facing radially inwardly to the bore, the annular shaft wall defining a front flange projecting radially outwardly on the from the inner surface, the front flange defining a hub side surface and an engine side surface opposite the hub side surface and axially spaced apart therefrom, the hub side surface of the front flange adapted to abut with a propeller hub, the front flange having a base defined by a shaft wall section having a progressively reducing wall thickness measured from the inner surface to the outer surface of the annular shaft wall, from the engine side surface of the front flange; and a sleeve coupled to the annular shaft wall within the bore by an interference fit between the sleeve and the inner surface of the annular shaft wall, at least part of the sleeve axially aligned with the front flange, the sleeve axially extending from a front sleeve end to a rear sleeve end, the rear sleeve end axially offset from the engine side surface of the front flange at the base of the front flange, the sleeve extending and contacting the inner surface of the annular shaft wall axially beyond the base of the front flange.

2. The propeller shaft assembly as defined in claim 1, wherein the interference fit has a tolerance within the following range: from 0.0004 inch and 0.003 inch per inch of diameter of the bore where the sleeve interfaces with the inner surface.

3. The propeller shaft assembly as defined in claim 1, wherein the annular shaft wall has a cylindrical portion extending from the base of the front flange, the cylindrical portion having a constant thickness H measured from the inner surface to the outer surface of the annular shaft wall, the sleeve has an annular sleeve wall having a thickness h, a ratio H/h is between 0.4 and 2.5.

4. The propeller shaft assembly as defined in claim 3, wherein the thickness h of the sleeve is constant from the front sleeve end to the rear sleeve end.

5. The propeller shaft assembly as defined in claim 1, wherein the base defines a fillet merging with the engine side surface of the front flange.

6. The propeller shaft assembly as defined in claim 5, wherein the fillet has a radius varying along a chord length of the fillet.

7. The propeller shaft assembly as defined in claim 1, the hub side surface and the engine side surface of the front flange are flat surfaces.

8. The propeller shaft assembly as defined in claim 1, further comprising the propeller hub removably connected to the front flange, the propeller hub having a flange engaging surface axially engaging the hub side surface of the front flange.

9. The propeller shaft assembly as defined in claim 1, wherein the sleeve extends axially beyond the hub side surface and the engine side surface of the front flange.

10. A propeller shaft assembly for an aircraft engine, comprising:

a shaft having a bore extending through the shaft at a front end thereof, the front end of the shaft having an outer surface facing radially outwardly from the shaft and an inner surface spaced apart from the outer surface and facing radially inwardly to the bore, the shaft having a front flange extending radially outwardly on the outer surface, the front flange defining a hub side surface adapted to face a propeller hub and an engine side surface opposite the hub side surface, wherein the shaft has an annular shaft wall defining the inner surface and the outer surface, the annular shaft wall has a cylindrical portion extending from a base of the front flange, the cylindrical portion having a constant thickness, the base of the front flange defining a fillet; and a sleeve coupled to the shaft within the bore, the sleeve radially loaded against the inner surface of the shaft, the sleeve extending axially from a front sleeve end to a rear sleeve end, the rear sleeve end axially offset relative to the engine side surface, the sleeve extending and contacting the inner surface of the annular shaft wall axially beyond the fillet.

11. The propeller shaft assembly as defined in claim 10, wherein the sleeve is coupled to the shaft by an interference fit between the sleeve and the shaft, the interference fit has a tolerance within the following range: from 0.0004 inch and 0.003 inch per inch of diameter of the bore where the sleeve interfaces with the inner surface.

12. The propeller shaft assembly as defined in claim 11, wherein the cylindrical portion extends from an end of the fillet and has a constant thickness H measured from the inner surface to the outer surface of the shaft, the sleeve has an annular sleeve wall having a thickness h, a ratio H/h is between 0.4 and 2.5.

13. The propeller shaft assembly as defined in claim 12, wherein the bore has a first bore section along the sleeve and a second bore section extending from the first bore section, the first bore section having a greater bore size than that of the second bore section, the sleeve extending in the first bore section.

14. The propeller shaft assembly as defined in claim 13, wherein the second bore section is axially spaced from the rear end of the sleeve.

15. The propeller shaft assembly as defined in claim 13, wherein the thickness H of the annular shaft wall is in the first bore section overlapping with the annular sleeve wall having the minimum thickness h.

16. The propeller shaft assembly as defined in claim 10, wherein the sleeve extends axially beyond the hub side surface and the engine side surface of the front flange.

* * * * *